May 13, 1941.  G. W. ROBINSON ET AL  2,241,717
CONVERSION OF HYDROCARBONS
Filed June 15, 1937
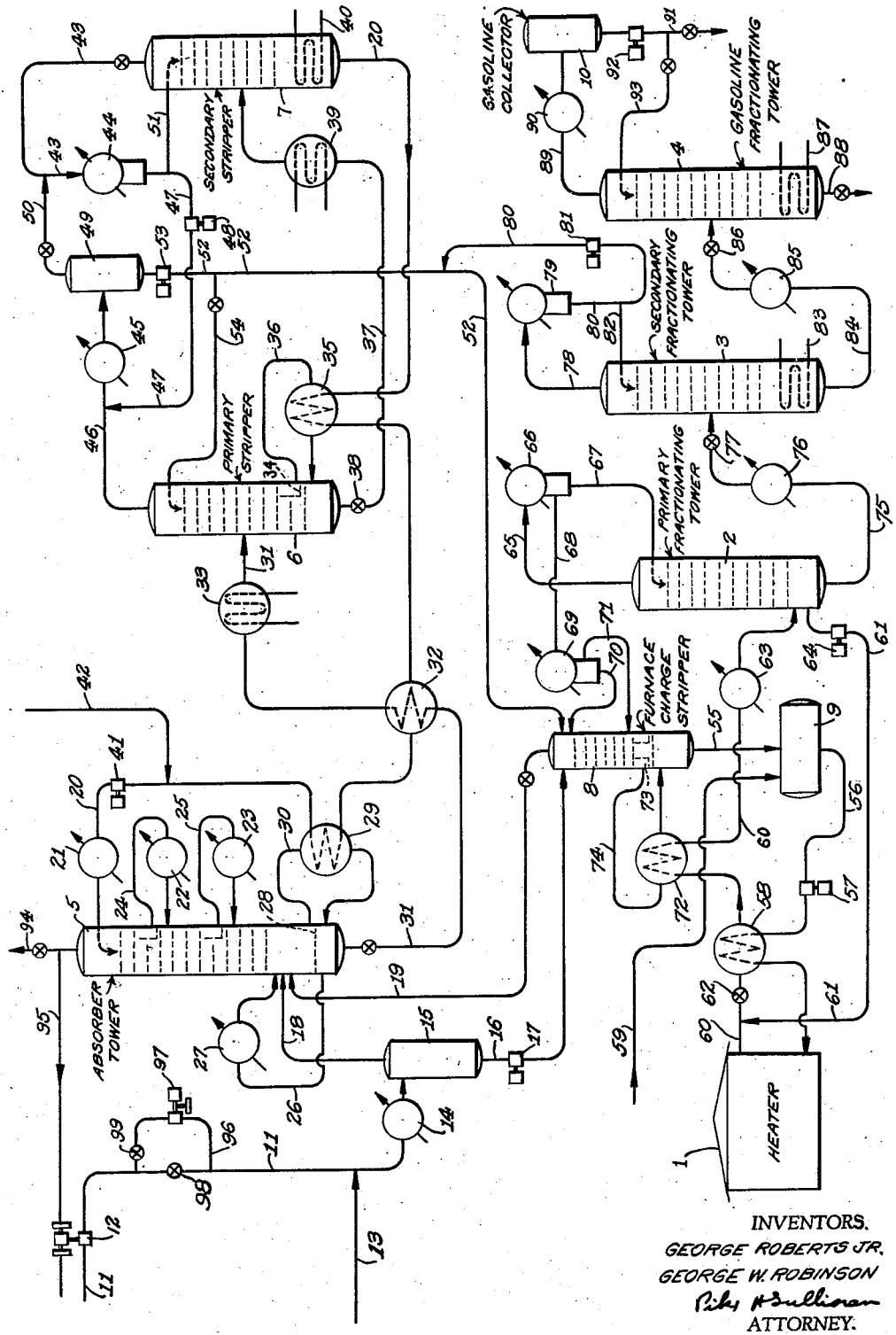
INVENTORS.
GEORGE ROBERTS JR.
GEORGE W. ROBINSON
ATTORNEY.

UNITED STATES PATENT OFFICE 2,241,717

CONVERSION OF HYDROCARBONS

George W. Robinson, Houston, Tex., and George Roberts, Jr., Montclair, N. J., assignors to The Polymerization Process Corporation, Jersey City, N. J., a corporation of Delaware Application June 15, 1937, Serial No. 148,274

2 Claims. (Cl. 196—10)

This invention relates to the production of normally liquid hydrocarbons, including gasoline or motor fuel constituents, from normally gaseous hydrocarbons. More particularly, the invention relates to a process for effecting the conversion of hydrocarbon gases, such as those produced in oil cracking operations or from natural gas sources, to hydrocarbons of higher boiling point suitable for use as motor fuel.

Normally gaseous hydrocarbons, preferably after the removal of hydrogen and methane and excessive quantities of ethane, may be treated to convert a substantial proportion thereof to normally liquid products by means of a single-step operation wherein the gases are heated to a temperature of 750° to 1250° F. at pressures in excess of 400 pounds per square inch, or by heating them to higher temperatures and lower pressures, or by heating them at lower temperatures in the presence of suitable catalysts. The products of such conversion operations, which may be the result of polymerization or related reactions, include hydrogen, normally gaseous hydrocarbons, and normally liquid hydrocarbons including those which form constituents of gasoline.

In carrying out such a conversion operation the conversion products are ordinarily fractionated to produce a normally gaseous fraction and a normally liquid fraction. The normally liquid fraction is removed for treatment to recover gasoline therefrom, and the normally gaseous fraction is further fractionated to recover any hydrocarbons suitable for further conversion treatment. These hydrocarbons are combined with similar hydrocarbons from an extraneous source and subjected therewith to further conversion treatment.

This invention contemplates the separation of normally liquid from normally gaseous constituents in conversion reaction products of the nature described above, under conditions which provide efficient recovery of normally liquid constituents, efficient separation of convertible constituents from the normally gaseous products of conversion, and a system which permits the use of a liquid stream, withdrawn from the products of conversion and containing convertible constituents, for use as a cooling medium for admixture with the products of conversion to cool the latter. The invention also contemplates preliminary treatment of hydrocarbon gases from any suitable source such as natural gas, or gases produced in oil cracking, such as the overhead gas from a high-pressure separator or the reflux from a gasoline stabilizer, or both, to obtain therefrom a charging stock of superior quality and to efficiently recover from such gases substantially all the constituents thereof desired or suitable for conversion to normally liquid products. It is an object of the present invention to produce an improved operating method and cycle for carrying out a recycling type of gas conversion process including such additional operating results as may be found to obtain.

The invention contemplates the treatment of a stream of normally gaseous hydrocarbons under pressure by the application of heat to effect conversion of at least a portion thereof to normally liquid hydrocarbons and the separation of the conversion products into normally liquid and normally gaseous constituents in two stages. In the first stage the conversion products are maintained under conditions of temperature and pressure to effect separation of a gaseous fraction predominating in the lower-boiling normally gaseous hydrocarbons and a liquid fraction consisting of normally liquid constituents and a substantial proportion of the higher-boiling normally gaseous constituents of the conversion products.

The gaseous fraction is passed to a separating zone wherein conditions are maintained to effect the separation therefrom of a liquid fraction and a gaseous fraction predominating in hydrogen and methane. Liquefied normally gaseous hydrocarbons may be introduced into this zone to assist in the separation. The liquid fraction separated in this separating zone consists substantially entirely of those normally gaseous hydrocarbons most suitable for conversion operations, and from this fraction may be drawn the stream undergoing conversion treatment, as described above.

A portion of the liquid fraction consisting of normally liquid hydrocarbons containing dissolved therein normally gaseous hydrocarbons separated in the first stage of separation of the conversion products, described above, may be admixed with the conversion products before separation thereof to cool the latter.

The remainder of the liquid fraction separated in the first stage of separation may be passed to a second stage of separation wherein separation of normally liquid and normally gaseous hydrocarbons is effected. The normally gaseous hydrocarbons, containing substantially no incondensibles, may be liquefied and passed to the separating zone to assist in the separation of the gaseous fraction predominating in the hydrogen and methane and, incidentally, to furnish part of the conversion reaction charge. The separating zone is maintained under proper temperature and pressure conditions to effect stabilization of the liquid fraction therein which constitutes conversion charge by stripping from it gases undesired for conversion treatment.

The normally liquid fraction separated in the second stage may be further fractionated to separate therefrom a gasoline fraction or may be withdrawn for treatment with liquid products of oil cracking.

The two-stage separation of the conversion products is preferably accomplished under lower pressure than that which obtains in the conversion reaction with the second stage being maintained under substantially lower pressure than that in the first stage. The first stage of separation, however, may be carried out at or only slightly below the conversion reaction pressure.

The fresh feed to the system may consist of gaseous hydrocarbons from any of the sources mentioned above. According to the present invention a stream of such normally gaseous hydrocarbons is separated into a liquid fraction, consisting of liquefied normally gaseous hydrocarbons, which is introduced to the separating zone, and a gaseous fraction which is introduced to a scrubber or absorber for the recovery of convertible constituents remaining in the gases. To this scrubber or absorber also is introduced the gaseous fraction predominating in hydrogen and methane separated in the separating zone. The gases from these sources pass through the absorber or scrubber in intimate contact with liquid absorbent medium such as a gas oil. The enriched absorbent medium is withdrawn from the scrubber and stripped, preferably in two stages, of the normally gaseous hydrocarbons dissolved therein. These hydrocarbons are liquefied and introduced into the separating zone to assist in the separation therein of the gaseous fraction predominating in hydrogen and methane and to furnish part of the conversion charge. The dry gases, scrubbed of convertible constituents, are withdrawn from the scrubber and expanded through a work engine to drive a compressor acting on the fresh gas feed for the system.

The invention is illustrated in the accompanying drawing in which the figure is a diagrammatic view in elevation of apparatus suitable for carrying out the present invention. It is to be understood, however, that the drawing is illustrative only, the invention being capable of other modifications which may be beyond the physical limitations of the apparatus indicated.

In the drawing a heater 1 which may be of any suitable construction, fractionating towers 2, 3 and 4, absorber tower 5, strippers 6 and 7, furnace charge stripper 8, accumulator 9, and gasoline collector 10 are indicated, together with auxiliary equipment for carrying out the process. Fresh feed, which may include natural gas or gases produced in oil cracking operations, or both, is introduced to the system through line 11 by means of compressor 12. Additional gases which may be already under high pressure, such as those recovered in a high-pressure separator of oil-cracking products, may be introduced to the system, without the use of the compressor 12 through line 13 which connects with line 11 beyond the compressor. The gases so introduced under pressure are cooled by passage through cooler 14 located in line 11 with liquefaction of higher-boiling normally gaseous hydrocarbons. The cooled and partially liquefied stream is introduced to a separator 15 in which the liquefied fraction, which preferably predominates in $C_3$ and $C_4$ hydrocarbons, is collected as liquid. This liquid is withdrawn from separator 15 through line 16 by means of pump 17 and introduced into a furnace-charge stripper 8.

The uncondensed gases separated in separator 15 are withdrawn through line 18 and introduced into an absorber tower 5 wherein they are scrubbed jointly with gases from furnace-charge stripper 8 which also are introduced into absorber tower 5 by means of line 19 which connects with the upper portion of furnace-charge stripper 8.

In absorber tower 5 the gases pass upwardly in countercurrent with descending liquid absorbent medium, which suitably may be gas oil or gasoline. The absorbent medium is introduced into the upper portion of the absorber tower 5 through line 20, after being cooled in cooler 21 located in line 20. As the gases ascend the absorber tower 5 in intimate contact with the descending absorbent medium a final recovery of desired convertible constituents contained in the gases is effected, these constituents being dissolved in the absorbent medium. The scrubbed gases are withdrawn from absorber tower 5 through line 94 and thus may be passed from the system, or all or a portion thereof may be diverted from line 94 through line 95 and expanded through a work engine connected to drive compressor 12. The expanded cooled gases may then be used for cooling purposes in other parts of the system. In addition to compressor 12 a second compressor 97 may be provided to replace or supplement compressor 12. Compressor 97 is located in line 96 connected at both ends to line 11. Valve 98 located in line 11 between the ends of line 96 may be closed, and valve 99 in line 96 may be opened to divert the feed through line 96 and compressor 97.

Coolers 22 and 23 are connected with the absorber tower 5 at intermediate portions thereof to cool portions of the descending absorbent medium which are circulated through the coolers and back to the absorber tower 5, through lines 24 and 25, respectively. In this manner the heat of absorption is removed from the absorbent medium, and maximum absorption of convertible constituents is accomplished.

The enriched absorbent medium collects in the bottom of absorber tower 5 and is maintained at a temperature substantially higher than that obtained in the portions of the absorber tower wherein contact of liquids and gases occurs. As a result of the substantially higher temperature maintained in the enriched absorbent medium in the bottom of absorber tower 5 partial stripping of absorbed gases from the absorbent medium is obtained. This serves to remove from the enriched absorbent medium substantially all non-condensibles and permits complete condensation or liquefaction of gases subsequently stripped from the enriched absorbent medium after withdrawal of the latter from absorber tower 5. In order to maintain the lower temperature conditions in that portion of the absorber tower 5 wherein contact of liquids and gases occurs the gases stripped from the enriched absorbent medium in the bottom of the tower are withdrawn from a point just above the liquid level, cooled and re-introduced at a point adjacent the point of introduction of the gases from separator 15 and furnace-charge stripper 8. This may be accomplished by the provision of a line 26 provided with a cooler 27 which withdraws gases from the tower at a point above the liquid level in the tower and substantially below the point of introduction of the gases to be scrubbed, cools the gases so withdrawn and re-introduces them into the absorber tower 5 at the place of introduction of the gases to be scrubbed. The higher temperature desired in the liquid in the bottom of the absorber tower 5 may be obtained by circulating a portion of this liquid in heat exchange with a suitable source of heat, for example, recirculated absorbent medium impoverished of dissolved gases by subsequent stripping operations. For example, plate 28 may be provided to collect enriched descending absorbent medium at a point below the introduction of the gases to be scrubbed. The absorbent medium so collected is circulated through a heat exchanger 29 by means of line 30 which connects with the absorber tower 5 at points above and below the plate 28. With tower 5 maintained, for example, at 400 pounds per square inch pressure, the temperature in that portion where gas and liquid contact occurs may be maintained at about 100° F. while the temperature of the liquid in the bottom may be kept at about 190° F.

The maintenance of the absorber tower 5 under the temperature conditions described above permits the most efficient use of the absorber tower by providing contact of absorbent medium and gases at a relatively low temperature, thus permitting the use of a relatively small quantity of absorbent medium. At the same time it prevents the inclusion in the absorbent medium withdrawn from tower 5 of difficultly condensible gases, such as methane, and permits individual control of the nature and quantity of hydrocarbons dissolved in the absorbent medium withdrawn from the tower 5 by means of regulation of the temperature maintained in the bottom of the tower 5. Furthermore, the maintenance of the lower temperature in the upper portion of the scrubber or absorber tower minimizes loss of lighter constituents of the liquid absorbent medium through vaporization in the gases withdrawn through line 94.

Enriched absorbent medium is withdrawn from absorber tower 5 by means of line 31 which passes through heat exchanger 32 and, if necessary, heater 33, to raise the temperature of the absorbent medium in preparation for the subsequent stripping operation. From line 31 the heated enriched absorbent medium is introduced into a primary stripper 6 in which a portion of the hydrocarbons dissolved therein is separated. The separated gases ascend to the top of primary stripper 6, and the partially impoverished absorbent medium collects in the bottom of primary stripper 6 where it may be heated, if desired, to effect further removal of dissolved gases therefrom. This heating may be accomplished by collecting a portion of the descending absorbent medium in trap-out tray 34 and circulating the liquid so collected through heat exchanger 35, in indirect contact with the previously-mentioned recirculated impoverished absorbent medium, and back to the primary stripper 6 at a point below the trap-out tray 34, by means of line 36. The primary stripper 6 is maintained at conditions of temperature and pressure to effect stripping from the absorbent medium of the lighter gases dissolved therein such as the C3 hydrocarbons. For example, when maintaining the stripper 6 under a pressure of about 375 pounds per square inch the bottom temperature may be about 375° F. with a top temperature of about 90 to 100° F. to prevent loss of absorbent medium by vaporization in the gases.

The partially impoverished absorbent medium is withdrawn from the bottom of primary stripper 6 through line 37 and introduced into a secondary stripper 7 at a reduced pressure, for example, 150 pounds per square inch, the reduction in pressure being accomplished by means of valve 38 located in line 37. A heater 39 may also be provided in line 37 to heat the partially impoverished absorbent medium passing therethrough in preparation for the subsequent stripping operation in secondary stripper 7.

In secondary stripper 7 substantially all the remaining normally gaseous hydrocarbons dissolved in the absorbent medium are stripped therefrom, the gases recovered in secondary stripper 7 being substantially higher boiling than those recovered in primary stripper 6, for example, the C4 hydrocarbons. Heating means 40 may be provided in the bottom of secondary stripper 7 to heat the absorbent medium collected therein to strip therefrom any gases remaining dissolved therein. For example, at 150 pounds per square inch pressure a bottom temperature of about 550° F. may be employed with a top temperature of about 110° to prevent loss of absorbent medium.

The substantially completely impoverished absorbent medium is withdrawn from secondary stripper 7 through line 20, and its sensible heat may be utilized to heat enriched or only partially impoverished absorbent medium in heat exchangers 35, 32 and 29 which are connected with line 20, and, as stated above, the recirculated absorbent medium may be cooled in cooler 21 prior to introduction to absorber tower 5. A pump 41 may be provided in line 20 to circulate the impoverished absorbent media through line 20 into absorber tower 5 against the higher pressure maintained therein. Additional absorbent medium may be introduced to the system, to replace any losses, through line 42 which connects with line 20 in front of pump 41.

The normally gaseous hydrocarbons separated from the absorbent medium in secondary stripper 7 ascend to the top thereof and are withdrawn therefrom through line 43 and passed thereby to condenser 44 for liquefaction.

The normally gaseous hydrocarbons separated from the absorbent medium in primary stripper 6 ascend to the top thereof and are withdrawn therefrom by means of line 46 which includes a cooler 45. Liquefied normally gaseous hydrocarbons condensed in condenser 44 are withdrawn therefrom and admixed with the gases passing through line 46 prior to their admission to cooler 45 by means of line 47 which is provided with pump 48. The mixture of the liquefied normally gaseous hydrocarbons with the gases in line 46 lowers the dew-point of the resulting mixture, permits easier condensation and then facilitates the substantially complete condensation of the gases in cooler 45. From line 46 the substantially condensed gases are introduced to separator 49 in which any uncondensed gases are separated and are withdrawn overhead through line 50, which connects the separator 49 with the line 43, in which gases from the top of secondary stripper 7 are passed to condenser 44. In condenser 44 these gases are completely condensed together with the gases from secondary stripper 7.

A portion of the liquefied normally gaseous hydrocarbons from condenser 44 may be withdrawn from line 47 and returned as reflux to secondary stripper 7 through line 51 to maintain the desired low top temperature in the stripper 7.

The liquefied normally gaseous hydrocarbons collected in separator 49 are withdrawn therefrom through line 52 provided with a pump 53 and introduced to furnace-charge stripper 8. A portion of the liquefied normally gaseous hydrocarbons passing through line 52 may be withdrawn therefrom and returned as reflux to primary stripper 6 through line 54 to maintain proper temperature conditions therein.

In furnace-charge stripper 8 the liquefied normally gaseous hydrocarbons are stabilized in a manner described below and are withdrawn therefrom through line 55 to accumulator 9. From accumulator 9 the normally gaseous hydrocarbons are withdrawn through line 56 by means of pump 57 and introduced to heater 1 after being preheated by heat exchange with the hot products of conversion in heat exchanger 58. It is to be understood, of course, that additional liquefied normally gaseous hydrocarbons may be introduced to accumulator 9 from an extraneous source, for example, by means of line 59.

In the heater 1 the normally gaseous hydrocarbons introduced therethrough are maintained under conditions of temperature and pressure suitable for conversion of at least a portion thereof of normally liquid hydrocarbons. The conditions of conversion will depend upon the nature of the liquid desired and the constituents of the charge thereto. For example, the hydrocarbons may be heated to a temperature of 750° to 1250° F. under pressures of at least 400 pounds per square inch, such as between 400 to 3000 pounds per square inch. As a specific example, they may be heated under a pressure of 1200 pounds per square inch to an exit temperature of 1030° F.

The products of conversion are withdrawn from heater 1 by means of line 60 and may be admixed with a cooling liquid introduced to line 60 through line 61. Thereafter pressure is reduced, if necessary or desired, by means of valve 62 in line 60, and the mixture of cooling liquid and conversion products is further cooled by passage through heat exchanger 58 in indirect contact with the incoming charge. The mixture of conversion products and cooling liquid may be further cooled by heat exchange and, if desired, by a final cooler 63 in its passage through line 60 from which it is introduced into primary fractionating tower 2.

Primary fractionating tower 2 is maintained at elevated pressure which may, however, be substantially lower than the pressure maintained in heater 1. For example, the temperature of the products entering primary fractionating tower 2 will determine largely the pressure necessary to effect the separation of gases desired. However, it is feasible to cool the mixture of conversion products and cooling fluid to a temperature of approximately 225° F. before admission to the primary fractionating tower 2, and at this temperature a pressure of 600 pounds per square inch is satisfactory for accomplishing the desired separation of gases from the said mixture. Primary fractionating tower 2 is operated to separate from the products therein a gaseous fraction predominating in hydrogen and methane and other difficultly convertible hydrocarbons, leaving the major proportion of the most easily convertible hydrocarbons such as the $C_3$ and $C_4$ hydrocarbons dissolved in the normally liquid hydrocarbons which collect in the bottom of the tower 2. A portion of these normally liquid hydrocarbons containing dissolved therein relatively high-boiling normally gaseous hydrocarbons is withdrawn from tower 2 through line 61 by means of pump 64 and admixed with the hot products of conversion emerging from the heater 1 through line 60. This serves to cool the hot products of conversion to prevent over-conversion.

The gases separated in primary fractionating tower 2 predominating in hydrogen and methane and the more difficultly convertible hydrocarbons such as the $C_2$ and $C_3$ hydrocarbons are withdrawn from the tower 2 by means of line 65 and introduced to condenser 66 wherein a portion thereof may be liquefied for return by means of line 67 to fractionating tower 2 as reflux to assist in the separation desired therein. The uncondensed gases are withdrawn from condenser 66 through line 68 and passed to condenser 69 in which a further liquefaction of a portion of the gases is accomplished. The liquefied normally gaseous hydrocarbons are withdrawn from condenser 69 through line 70 and introduced into the top of furnace-charge stripper 8. The uncondensed gases are withdrawn from condenser 69 through line 71 and introduced to furnace-charge stripper 8 at an intermediate portion therein.

In furnace-charge stripper 8 conditions of pressure and temperature are maintained to stabilize the furnace charge which is introduced therein through lines 16, 52 and 70 and effect a scrubbing of the convertible constituents still remaining in the gases introduced through line 71. For example, the stripper 8 may be maintained at a pressure of approximately 600 pounds with a top temperature of 85° F. and a bottom temperature of 180° F. The top temperature is effected by the temperature and quantity of liquids introduced through lines 16 and 52 and is regulated by the degree of cooling effected in condenser 69. Suitable heating means may be provided in the bottom of stripper 8 to maintain the desired temperature in the liquids collected therein. Advantageously, a portion of the liquids in the bottom of the stripper 8 may be passed in indirect heat exchange with the products of conversion passing through line 60 in heat exchanger 72. Trap-out tray 73 may be provided in the furnace-charge stripper 8 to collect a portion of the descending liquid. The collected liquid is withdrawn from trap-out tray 73 through line 74 and circulated through heat exchanger 72 wherein it is heated to the desired degree and returned to furnace-charge stripper 8 at a point below trap-out tray 73.

The liquids containing dissolved therein normally gaseous constituents collected in the bottom of the primary fractionating tower 2 are withdrawn therefrom through line 75 and, if desired, through cooler 76 located in line 75 and introduced into secondary fractionating tower 3 at a pressure substantially lower than that obtaining in tower 2, the reduction in pressure being effected conveniently by means of valve 77 located in line 75. In the secondary fractionating tower 3 conditions of temperature and pressure are maintained to separate normally gaseous constituents from normally liquid constituents. The conditions of operation for the secondary fractionating tower 3 will depend upon the operation desired, the character of the material under treatment and the conditions of operation of primary fractionating tower 2. However, in connection with the conditions of operation for primary fractionating tower 2 set forth above by way of example, secondary fractionating tower 3 may conveniently be maintained at a pressure of approximately 400 pounds per square inch with a top temperature of approximately 170° F. and a bottom temperature of approximately 450° F. The gases separated in this tower consist substantially entirely of the relatively high-boiling normally gaseous hydrocarbons and predominate in $C_3$ and $C_4$ hydrocarbons. These gases ascend to the top of the tower and are withdrawn therefrom through line 78 in which they pass to a condenser 79 wherein, due to the fact that the gases consist substantially entirely of the relatively high-boiling normally gaseous hydrocarbons, the stream is entirely liquefied. The liquids are withdrawn from condenser 79 through line 80 by means of pump 81 located at line 80 and admixed with the liquefied normally gaseous hydrocarbons passing through line 52 to the furnace-charge stripper 8. A portion of the liquefied gases withdrawn from condenser 79 through line 80 may be diverted from line 80 through line 82 for return to the top of the secondary fractionating tower 3 as reflux to assist in maintaining the proper temperature therein.

The liquid fraction separated in secondary fractionating tower 3 collects in the bottom of the tower and may be heated by any suitable heating means such as heater 83 to drive off normally gaseous hydrocarbons dissolved therein. These liquids are then withdrawn from the bottom of tower 3 through line 84 and introduced to a gasoline fractionating tower 4 after being cooled, if desired, by passage through cooler 85 located in line 84. The fractionating operation in gasoline-fractionating tower 4 may be accomplished at a lower pressure than that obtaining in tower 3, in which case the reduction in pressure may be conveniently effected by means of valve 86 located in line 84. In gasoline-fractionating tower 4 a gasoline fraction is separated overhead as vapor, and the remaining heavier liquids collect in the bottom of the tower. These liquids may be heated by heating means 87 to effect a complete separation of gasoline, and the heated liquids may then be withdrawn from secondary fractionating tower 4 through line 88 for further treatment elsewhere. The gasoline vapors overhead are withdrawn through line 89, condensed in cooler 90 and collected in gasoline collector 10 from which they may be withdrawn from the system through line 91 by means of pump 92 located in line 91. A portion of the gasoline liquid may be diverted from line 91 through line 93 for return as reflux to the top of gasoline fractionating tower 4 to assist in maintaining the proper temperature conditions therein. These temperature conditions are dependent entirely upon the nature of the cut desired and the pressure obtained.

Fractionating towers 2, 3, 4, strippers 6, 7 and 8 and absorber tower 5 are provided with suitable bubble caps or plates or other suitable gas and liquid contact means for assisting in the condensation, evaporation, absorption, stripping and other operations incidental to fractionation. It is apparent also that various pieces of equipment which are here indicated individually in order to simplify presentation of the subject matter may be combined in unitary structures. For example, strippers 6 and 7 may be combined in a unitary structure while the functions of fractionating towers 3 and 4 may be combined in a single structure provided with suitable trap-out trays and other necessary connections.

The invention has been described with reference to a specific modification illustrated by reference to specific apparatus. It is to be understood, however, that the invention is not to be limited by the specific modification or specific apparatus described but is capable of other embodiments which may be beyond the physical limitations of the apparatus illustrated in the drawing.

We claim:

1. The method of converting normally gaseous hydrocarbons to normally liquid hydrocarbons which comprises heating a stream of normally gaseous hydrocarbons under pressure to effect conversion thereof into normally liquid hydrocarbons including gasoline constituents, then separating said stream under pressure into a liquid fraction consisting of the normally liquid hydrocarbons and relatively high boiling normally gaseous hydrocarbons and a normally gaseous fraction predominating in the relatively low boiling normally gaseous constituents thereof, passing said normally gaseous fraction to a separatory zone to separate therefrom a fraction predominating in hydrogen and methane, withdrawing from said separatory zone liquefied normally gaseous hydrocarbons substantially stripped of hydrogen and methane and combining at least a portion thereof with said stream undergoing conversion, separating said liquid fraction under reduced pressure into normally gaseous constituents and normally liquid constituents including gasoline constituents, passing the gaseous fraction predominating in hydrogen and methane from said separatory zone through a scrubbing zone under pressure, introducing into said scrubbing zone and into intimate contact with said gases passing therethrough a liquid absorbent medium whereby convertible constituents remaining in said gases are dissolved in said absorbent medium, removing enriched absorbent medium from said scrubbing zone, stripping and recovering normally gaseous hydrocarbons from said removed enriched absorbent medium, introducing said recovered normally gaseous hydrocarbons into said separatory zone, introducing into the system from an extraneous source a stream of normally gaseous hydrocarbons, withdrawing scrubbed gases from said scrubbing zone, expanding said scrubbed gases, utilizing the expansion of said scrubbed gases to effect compression of said stream of said normally gaseous hydrocarbons from an extraneous source, cooling said compressed stream to effect separation therefrom of a liquid fraction, and introducing at least a part of said last-mentioned liquid fraction into said separatory zone to assist in said separation therein.

2. The method of treating a gaseous stream containing normally gaseous hydrocarbons having at least two carbon atoms per molecule to effect conversion thereof to normally liquid hydrocarbons which comprises compressing said gaseous stream, cooling said compressed stream to effect separation thereof into a gaseous fraction and a liquid fraction predominating in relatively high boiling normally gaseous hydrocarbons, introducing said liquid fraction into a separatory zone wherein liquefied normally gaseous hydrocarbons are fractionated to strip therefrom low boiling constituents, withdrawing from said separatory zone liquefied normally gaseous hydrocarbons substantially stripped of low boiling constituents, subjecting at least a portion of the liquefied normally gaseous hydrocarbons withdrawn from said separatory zone to conversion conditions of temperature and pressure to effect conversion of a portion thereof to normally liquid products, fractionating the conversion products to effect separation thereof into gaseous constituents and a liquid product, introducing gaseous constituents thus fractionated from the conversion products into said separatory zone to effect separation thereof into a normally gaseous fraction predominating in hydrogen and methane and a liquefied fraction suitable for further conversion treatment, withdrawing from said separatory zone said gaseous fraction predominating in hydrogen and methane, introducing said last-mentioned gaseous fraction and the gaseous fraction separated from the first-mentioned stream of normally gaseous hydrocarbons into a scrubbing zone under pressure, intimately contacting said gases in said scrubbing zone with a liquid absorbent medium to effect absorption therein of convertible constituents of said gases, removing the enriched absorbent medium from said scrubbing zone, recovering from said enriched absorbent medium normally gaseous hydrocarbons, introducing at least a portion of said last-mentioned normally gaseous hydrocarbons into said separatory zone, withdrawing scrubbed gases from said scrubbing zone, expanding said withdrawn scrubbed gases, and utilizing the expansion of said scrubbed gases to effect compression of said first-mentioned gaseous stream.

GEORGE W. ROBINSON.
GEORGE ROBERTS, Jr.